US006795272B2

(12) United States Patent
Kudo et al.

(10) Patent No.: US 6,795,272 B2

(45) Date of Patent: Sep. 21, 2004

(54) THIN FILM MAGNETIC HEAD AND MAGNETIC STORAGE APPARATUS

(75) Inventors: Kazue Kudo, Odawara (JP); Yasuyuki Okada, Odawara (JP); Moriaki Fuyama, Hitachi (JP); Yohji Maruyama, Iruma (JP); Gen Oikawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 106 days.

(21) Appl. No.: 10/217,451

(22) Filed: Aug. 14, 2002

(65) Prior Publication Data

US 2003/0095357 A1 May 22, 2003

(30) Foreign Application Priority Data

Nov. 19, 2001 (JP) .................................... P2001-352533

(51) Int. Cl.[7] .................................................. G11B 5/47

(52) U.S. Cl. ...................................................... 360/126

(58) Field of Search .......................................... 360/126

(56) References Cited

U.S. PATENT DOCUMENTS 6,381,093 B2 * 4/2002 Yoshida et al. ............. 360/126

6,557,242 B1 * 5/2003 Santini .................... 29/603.14

* cited by examiner

*Primary Examiner*—A. J. Heinz

(74) *Attorney, Agent, or Firm*—Antonelli, Terry, Stout & Kraus, LLP

(57) ABSTRACT

A thin film magnetic head includes a lower magnetic pole, an upper magnetic pole provided so as to face the lower magnetic pole, and a magnetic gap layer provided between the lower magnetic pole and the upper magnetic pole. The upper magnetic pole constitutes a first magnetic layer formed on a side facing the magnetic gap layer by means of sputtering and a second magnetic layer formed on the first magnetic layer by means of plating, in which the saturation magnetic flux density of the first magnetic layer is set higher than that of the second magnetic layer. The thin film magnetic head composed as above is capable of generating a stronger magnetic field owing to its stably-formed magnetic core, thereby recording on a high-coercivity medium and high-density recording are made possible.

10 Claims, 5 Drawing Sheets

THIN FILM MAGNETIC HEAD AND MAGNETIC STORAGE APPARATUS

BACKGROUND OF THE INVENTION

1. Field of the Invention

The present invention relates to a thin film magnetic head which is used for the recording/reproducing on a magnetic recording medium, a method for manufacturing the thin film magnetic head, and a magnetic storage apparatus including the thin film magnetic head.

2. Description of the Related Art

With the increase of the recording density of magnetic storage apparatuses, coercivity required of recording media is also advancing higher and higher, and as magnetic core material for recording heads, materials having high saturation magnetic flux density (Bs), that is, materials capable of outputting a strong magnetic field sufficient for the writing to the high-coercivity medium, are being required. Such materials having high saturation magnetic flux density (Bs) include CoNiFe (Bs: 1.7 T) whose Bs is higher than that of $Ni_{45}Fe_{55}$ (Bs: 1.6 T) which is being generally used as magnetic core material, as described in JP-A-6-89422, JP-A-8-241503, JP-A-6-346202 and JP-A-7-3489. JP2821456 also discloses a method for forming a plating layer having still higher Bs using a plating bath that does not contain saccharin sodium as a component of the plating solution.

In order to realize a high-recording-density magnetic storage apparatus, the use of such material having high saturation magnetic flux density (Bs) and being capable of outputting a strong magnetic field sufficient for the writing to a high-coercivity medium and a technique for forming a stable and thick magnetic core for the generation of a stronger magnetic field are both essential.

However, such a technique for the formation of a stable and thick magnetic core has not been established yet at present, and thus there has been realized no thin film magnetic head that is capable of generating a strong magnetic field sufficient for the writing to the high-coercivity medium.

SUMMARY OF THE INVENTION

It is therefore the primary object of the present invention to provide a thin film magnetic head that is capable of generating a strong magnetic field sufficient for the writing to a high-coercivity medium (of coercivity of 4000 Oe, for example), a method for manufacturing such a thin film magnetic head, and a magnetic storage apparatus including such a thin film magnetic head.

In order to form a magnetic layer (as the magnetic core) with high precision and to a considerable thickness, it is effective to employ electroplating. For carrying out the electroplating, an "underlayer", that is, a thin electrical conducting layer which is formed by sputtering, CVD (Chemical Vapor Deposition), etc., becomes necessary.

Therefore, the present inventors conducted close examination of the underlayers and found out that the formation of a magnetic core capable of outputting a strong magnetic field sufficient for the writing to high-coercivity media becomes possible by controlling the saturation magnetic flux density of the underlayer and that of the magnetic layer which is formed on the underlayer.

The thin film magnetic head, the method for manufacturing the thin film magnetic head, and the magnetic storage apparatus including the thin film magnetic head in accordance with the present invention were completed on the basis of the above finding. In a magnetic head comprising a lower magnetic pole, an upper magnetic pole which is provided so as to face the lower magnetic pole, and a magnetic gap layer which is provided between the lower magnetic pole and the upper magnetic pole, the upper magnetic pole includes a first magnetic layer which is formed on a side facing the magnetic gap layer by means of sputtering and a second magnetic layer which is formed on the first magnetic layer by means of plating. The saturation magnetic flux density of the first magnetic layer is set higher than that of the second magnetic layer.

The thin film magnetic head in accordance with the present invention having the above composition is capable of generating a stronger magnetic field owing to its stably-formed magnetic core.

BRIEF DESCRIPTION OF THE DRAWINGS

The objects and features of the present invention will become more apparent from the consideration of the following detailed description taken in conjunction with the accompanying drawings, in which.

DESCRIPTION OF THE EMBODIMENTS

Figure 1A:
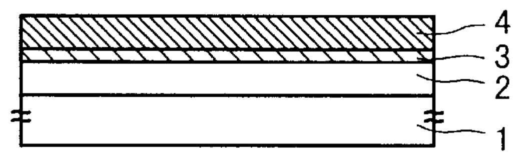
FIGS. 1A through 1D are schematic diagrams showing the process flow of a magnetic pole layer of a recording head of a thin film magnetic head in accordance with the present invention.

Referring now to the drawings, description will be given in detail of embodiments in accordance with the present invention.

The thin film magnetic head in accordance with the present invention constitutes a lower magnetic pole, an upper magnetic pole which is provided so as to face the lower magnetic pole, and a magnetic gap layer which is provided between the lower magnetic pole and the upper magnetic pole. The upper magnetic pole constitutes a first magnetic layer which is formed on a side facing the magnetic gap layer by means of sputtering and a second magnetic layer which is formed on the first magnetic layer by means of plating, in which the saturation magnetic flux density of the first magnetic layer is set higher than that of the second magnetic layer.

In the present situation in magnetic recording heads with the recording head track width of 1 μm or less and the gap layer thickness of 0.2 μm due to the increasing recording density, sufficient recording magnetic field might not be obtained if Bs in the vicinity of the gap is lower than Bs of the upper magnetic pole material.

Therefore, in the present invention, Bs of the first magnetic layer is set higher than Bs of the second magnetic layer. By such composition, the gap part of the head is prevented from being saturated before the upper magnetic pole, thereby various problems in conventional magnetic recording heads (serious decrease in the magnetic field gradient, rapid deterioration of characteristics at high frequencies, etc.) can be resolved.

The first magnetic layer and the second magnetic layer may contain CoNiFe or CoFe, and the composition of CoNiFe or CoFe be set as $10 \leqq Co \leqq 80$ wt %, $0 \leqq Ni \leqq 25$ wt %, and $15 \leqq Fe \leqq 90$ wt %. By such composition of CoNiFe or CoFe, a thin film magnetic head capable of generating a strong magnetic for enabling the high recording density can be obtained.

The density of Fe contained in the first magnetic layer may be set higher than the density of Fe contained in the second magnetic layer. By such composition, Bs of the first magnetic layer can be set higher than Bs of the second magnetic layer.

By the employment of a CoNiFe layer or a CoFe layer also for the second magnetic layer, the second magnetic layer is allowed to have excellent crystallinity and thereby the control of the orientation can be made easier. When different types of metals are stacked up, the so-called cell reaction tends to occur and there is a possibility of corrosion of the second magnetic layer containing CoNiFe, however, such corrosion is avoided if the first magnetic layer also contains CoNiFe as in the present invention.

Further, the second magnetic layer may be formed by use of a plating bath containing saccharin sodium as a stress relaxation agent. A thick magnetic layer of 3 $\mu$m or more becomes possible by means of plating under such condition.

By the thin film magnetic head which is composed as above, the writing to a recording medium of a coercivity of 4000 Oe or more is made possible.

In the following, the process flow for forming the magnetic pole layer of the recording head of the thin film magnetic head which has been described above will be explained in detail. FIGS. 1A through 1D are schematic diagrams showing the process flow of the magnetic pole layer.

Referring to FIG. 1A, after a 46NiFe layer 2 is formed on a substrate 1 having a reproducing head formed thereon, Ar gas is lead into the sputtering chamber which has reached a vacuum level of $5 \times 10^{-5}$ Pa or higher, and a plating underlayer (CoNiFe layer) 3 is deposited on the 46NiFe layer 2 to a thickness of 100 nm by means of DC sputtering or RF sputtering using a CoNiFe target.

At this stage, a thin layer of non-magnetic metal (thickness: about 5 nm) may also be deposited as an adhesion layer. On the structure formed as above, a CoNiFe layer 4 is formed by means of electroplating under a condition of a table 1 which is shown below, using a plating solution containing Co, Ni and Fe as ions and saccharin sodium (1.5 g/l) as a stress relaxation agent.

Figure 1B:
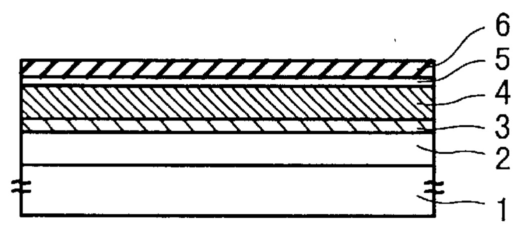

Referring to FIG. 1B, a magnetic gap layer 5 is formed on the structure of FIG. 1A. As the magnetic gap layer 5, a single layer or multilayer of insulator ($Al_2O_3$, $SiO_2$, etc.) can be employed. On the magnetic gap layer 5, a first magnetic layer 6 of CoNiFe is formed as a plating underlayer by means of sputtering similarly to the aforementioned plating underlayer.

Figure 1C:
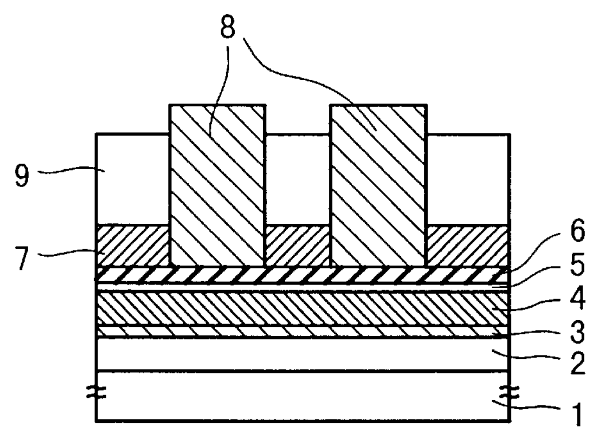

Referring to FIG. 1C, a photoresist frame 8 for the formation of an upper magnetic core is formed on the structure of FIG. 1B. After the photoresist frame 8 is patterned to a desired pattern, a second magnetic layer 7 of CoNiFe and a 46NiFe layer 9 are formed successively by means of plating. Incidentally, while 46NiFe layers are used for parts of the upper and lower magnetic poles in this explanation, it is also possible to form the magnetic poles by use of CoNiFe layers according to the present invention only. While the thickness of the underlayer was set to 100 nm, the object of the present invention can be attained by setting the thickness between 50 nm and 200 nm.

TABLE 1

| | |
|---|---|
| PLATING BATH TEMPERATURE | 30° C. |
| pH | 3.5 |
| ELECTRIC CURRENT DENSITY | 6 mA/cm$^2$ |
| Co++ | 5 g/l |
| Ni++ | 15 g/l |
| Fe++ | 2 g/l |
| SACCHARIN SODIUM | 1.5 g/l |

Figure 1D:
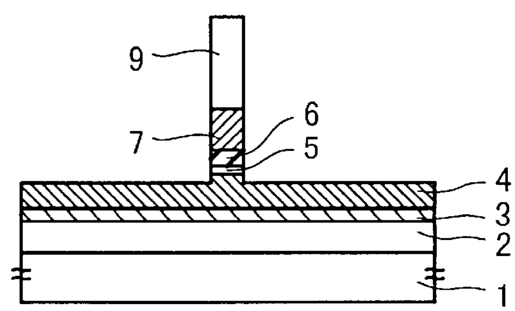
Figure 2:
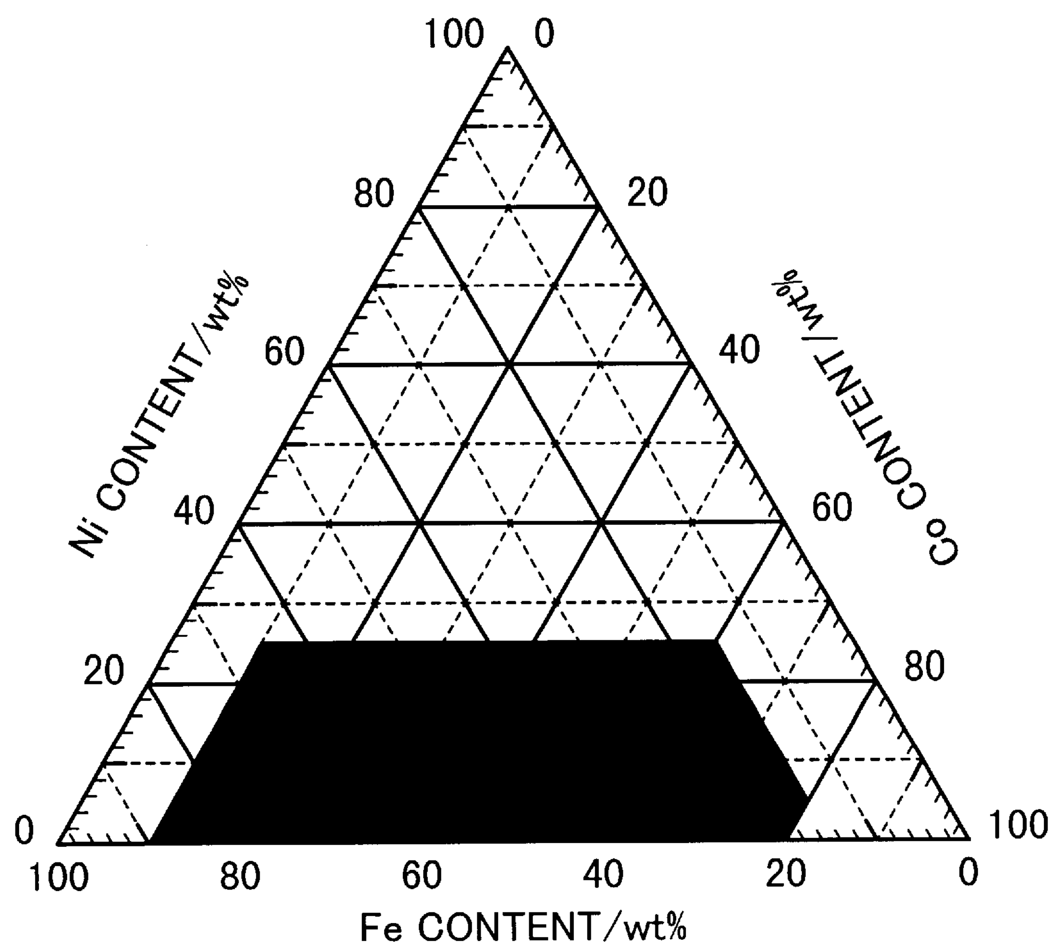
FIG. 2 is a ternary phase diagram showing composition of a CoNiFe layer of the thin film magnetic head.

Referring to FIG. 1D, the photoresist and the underlayer are removed, and a trimming process is conducted in order to shape the upper and lower magnetic cores to a predetermined track width. While a typical plating condition is shown in table 2, by setting the content of Co, Ni and Fe in ranges $10 \leqq Co \leqq 80$ wt %, $0 \leqq Ni \leqq 25$ wt %, and $15 \leqq Fe \leqq 90$ wt % as shown in the ternary phase diagram of FIG. 2, a high saturation magnetic flux density of Bs>2.0 T can be attained. In this case, the current to be applied can either be a direct current or a pulse current.

TABLE 2

| | |
|---|---|
| PLATING BATH TEMPERATURE | 25–35° C. |
| pH | 2.5–4.0 |
| ELECTRIC CURRENT DENSITY | 3–100 mA/cm$^2$ |
| Co++ | 2–20 g/l |
| Ni++ | 0–30 g/l |
| Fe++ | 0.5–10 g/l |
| SACCHARIN SODIUM | 0.5–2.0 g/l |

Figure 3:
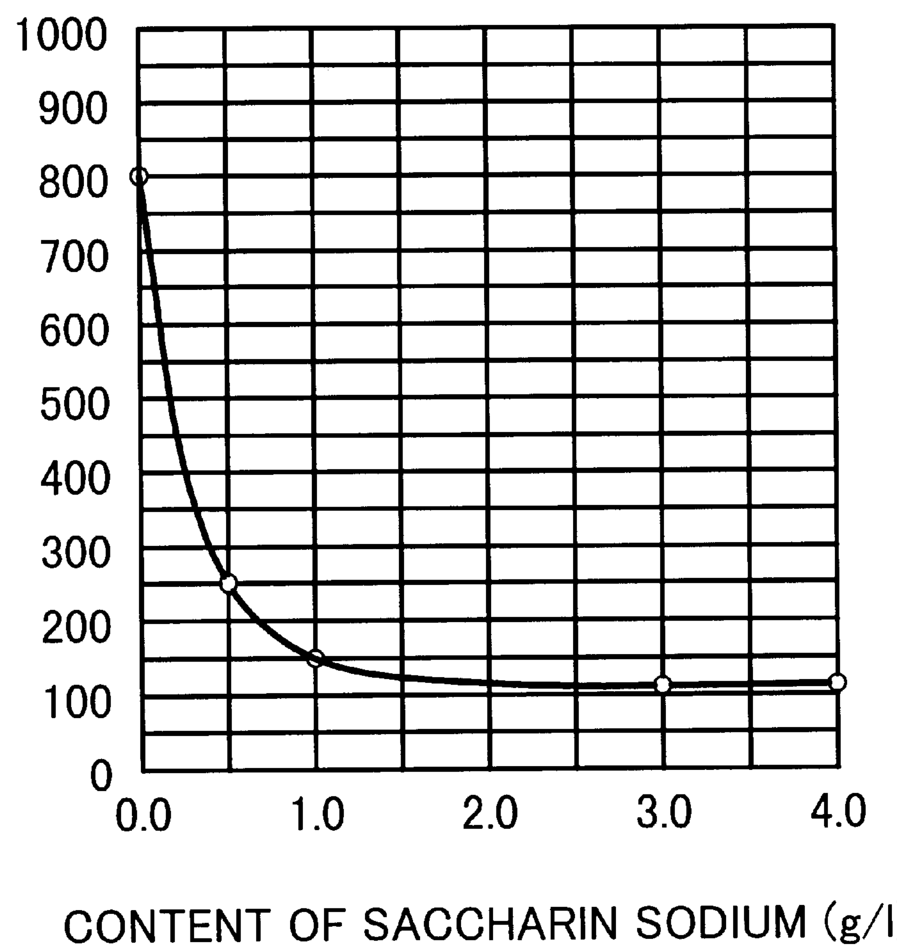
FIG. 3 is graph showing the relationship between the content of saccharin sodium in a plating solution and membrane stress of the CoNiFe layer.

Saccharin sodium is capable of relaxing the membrane stress to approximately 200 Mpa when added to the plating solution by 0.5 g/l or so, as shown in FIG. 3. However, the stress shows almost no change even if the saccharin sodium content is increased to 2.5 g/l or more. The increase of sulfur content due to the increase of saccharin sodium content deteriorates the corrosion resistance of the layer, therefore, the optimum saccharin sodium content in the plating solution is 0.5–2.0 g/l.

Figure 4:
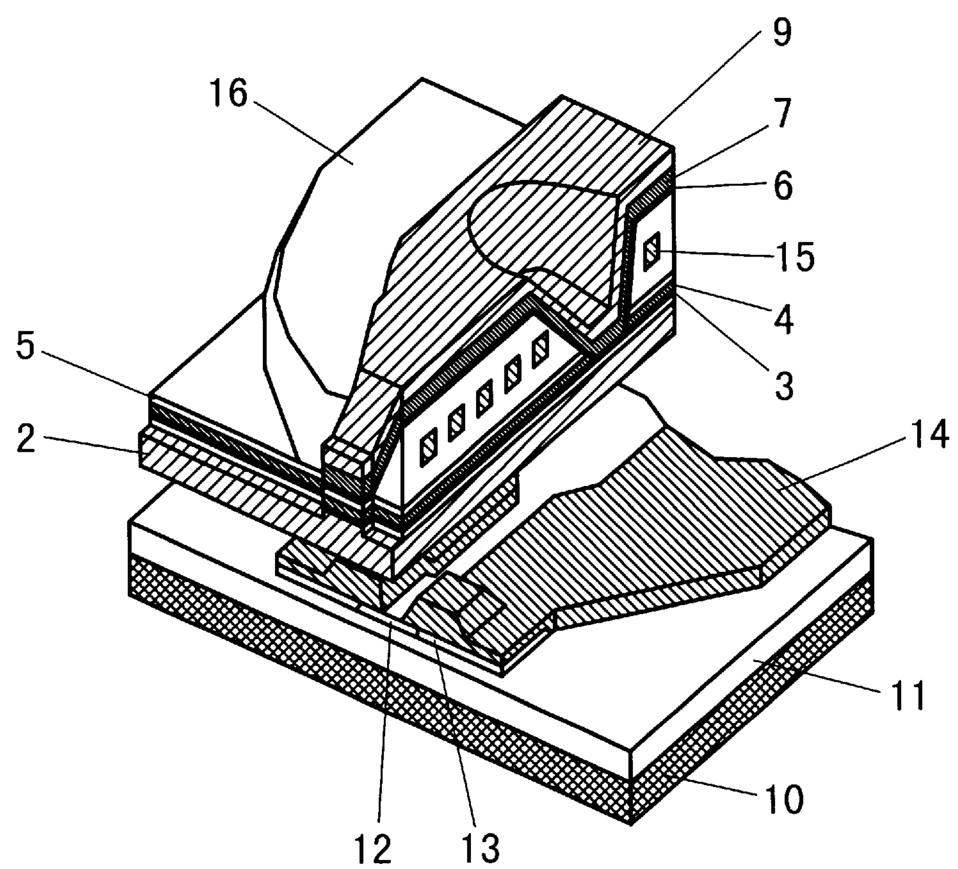
FIG. 4 is a partly sectional and broken perspective view of a recording/reproducing separation type thin film magnetic head in accordance with the present invention.

FIG. 4 is a partly sectional and broken perspective view of a recording/reproducing separation type thin film magnetic head in which CoNiFe layers formed according to the present invention are employed as parts of the upper and lower magnetic cores of the recording head.

The head of FIG. 4 is manufactured as follows. First, a lower shield layer 11 and a lower magnetic gap layer (not shown) are formed on a non-magnetic substrate 10, and an MR (MagnetoResistance) sensor or a GMR (Giant MagnetoResistance) sensor is formed thereon as a reproducing element 12. After forming a magnetic domain control layer 13 and an electrode layer 14, an upper magnetic gap layer and an upper magnetic shield layer (not shown) are formed.

Subsequently, a magnetic gap layer between the reproducing element and a recording element is formed. On the magnetic gap layer, a lower magnetic core including a lower magnetic pole is formed. First, the 46NiFe layer 2 is formed by means of plating as the lower magnetic core.

On the 46NiFe layer 2, the CoNiFe underlayer 3 is deposited by means of sputtering to a thickness of 100 nm and the CoNiFe plating layer 4 is deposited by means of plating to a predetermined thickness, thereby the lower magnetic pole is formed.

Subsequently, the magnetic gap layer 5 is formed on the CoNiFe plating layer 4, and a coil 15 for the application of recording current and an organic insulating layer 16 are formed.

Subsequently, an upper magnetic core including an upper magnetic pole is formed. First, the upper magnetic pole is formed by depositing the first magnetic layer 6 of CoNiFe on the magnetic gap layer 5 and the organic insulating layer 16 by means of sputtering to a thickness of 100 nm and depositing the second magnetic layer 7 of CoNiFe by means of plating.

On the second magnetic layer 7 made of CoNiFe, the 46NiFe layer 9 is formed by plating, thereby the upper magnetic core is formed. Incidentally, for the formation of the upper magnetic pole and the upper magnetic core, the aforementioned photoresist frame which is not shown in FIG. 4 is formed and used.

Subsequently, the photoresist and the underlayer are removed and a trimming process is conducted in order to shape the upper and lower magnetic cores to a predetermined track width. Further, a coil and an organic insulating layer are formed and a 46NiFe layer is formed by frame plating. The recording/reproducing separation type thin film magnetic head fabricated as above displayed excellent recording characteristics and was totally capable of writing to high-coercivity media.

Figure 5:
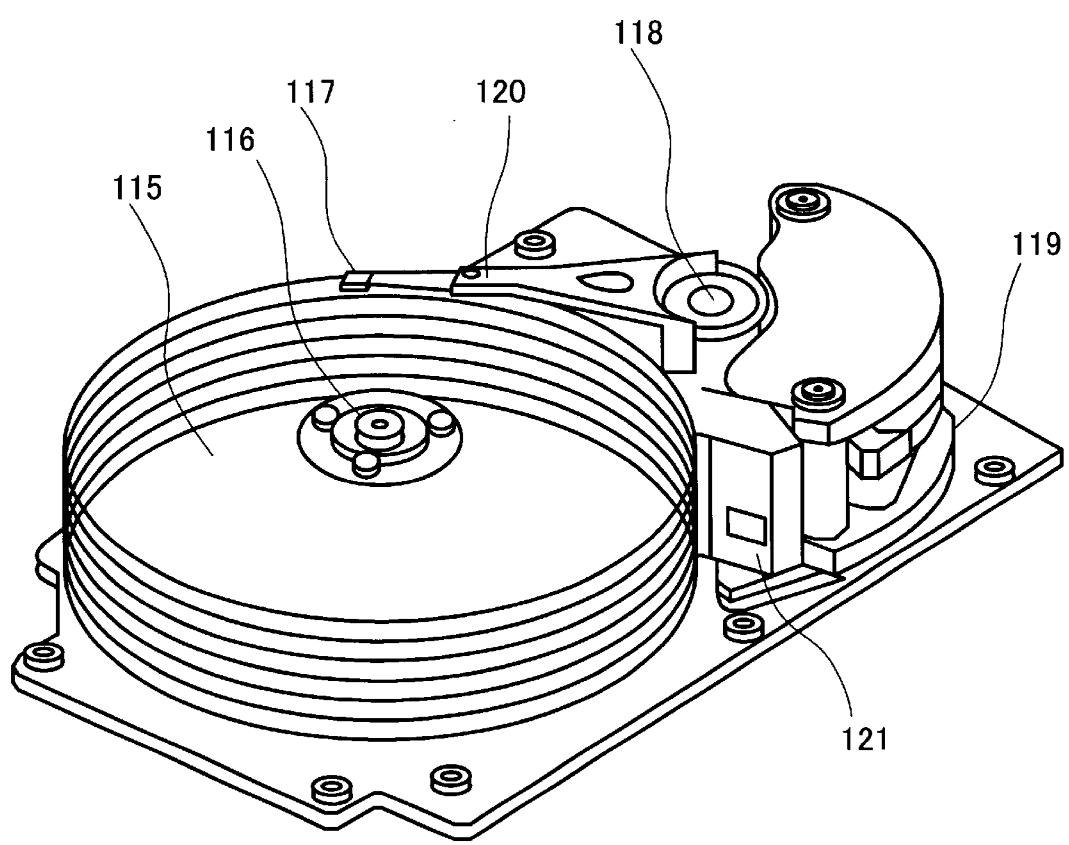
FIG. 5 is a schematic diagram showing a magnetic storage apparatus in accordance with the present invention.

A magnetic storage apparatus including the thin film magnetic head which has been described above is shown in FIG. 5. The magnetic storage apparatus of FIG. 5 includes magnetic disks 115 on which data or information is recorded, a motor 116 for spinning the magnetic disks 115, magnetic heads 117 in accordance with the present invention for writing/reading data to/from the magnetic disks 115, actuators 118 and voice coil motors 119 for placing the magnetic heads 117 at target positions on the magnetic disks 115.

The magnetic storage apparatus also includes springs 120 and guide arms 121. Each spring 120, to which the magnetic head 117 is attached, maintains the submicron space between the magnetic head 117 and the magnetic disk 115. Each guide arm 121, to which the spring 120 is fixed, is driven by the actuator 118 and the voice coil motor 119. Although not shown in FIG. 5, the magnetic storage apparatus includes a magnetic disk roll control system, a head positioning control system, and a read/write signal processing system.

By the above magnetic storage apparatus including the thin film magnetic head in accordance with the present invention, high-density recording on a high-coercivity medium is realized.

Other features may also include, as follows.

(1) A method for manufacturing a thin film magnetic head including a lower magnetic pole, an upper magnetic pole provided so as to face the lower magnetic pole, and a magnetic gap layer provided between the lower magnetic pole and the upper magnetic pole, wherein the upper magnetic pole is formed by:

depositing a first magnetic layer containing Co, Ni and Fe as $10 \leqq Co \leqq 80$ wt %, $0 \leqq Ni \leqq 25$ wt %, and $15 \leqq Fe \leqq 90$ wt % on the magnetic gap layer by means of sputtering, and depositing a second magnetic layer containing Co, Ni and Fe as $10 \leqq Co \leqq 80$ wt %, $0 \leqq Ni \leqq 25$ wt %, and $15 \leqq Fe \leqq 90$ wt % on the first magnetic layer by means of electroplating.

(2) A method for manufacturing a thin film magnetic head according to the description (1), wherein the second magnetic layer is formed by use of a plating bath containing saccharin sodium in its plating solution.

(3) A method for manufacturing a thin film magnetic head according to the description (2), wherein the content of the saccharin sodium contained in the plating bath is set to 0.5–2 g/l.

(4) A magnetic storage apparatus including:

a recording head including a magnetic head having a lower magnetic pole, an upper magnetic pole provided so as to face the lower magnetic pole, and a magnetic gap layer provided between the lower magnetic pole and the upper magnetic pole;

a reproducing head; and a magnetic recording medium whose coercivity is 4000 Oe or more, wherein:

the upper magnetic pole includes: a first magnetic layer formed on a side facing the magnetic gap layer by means of sputtering; and a second magnetic layer formed on the first magnetic layer by means of plating, and the saturation magnetic flux density of the first magnetic layer is set higher than that of the second magnetic layer.

As set forth hereinabove, in the thin film magnetic head in accordance with the present invention and the magnetic storage apparatus including the thin film magnetic head, the upper magnetic pole includes the first magnetic layer which is formed on a side facing the magnetic gap layer by means of sputtering and the second magnetic layer which is formed on the first magnetic layer by means of plating, in which the saturation magnetic flux density of the first magnetic layer is set higher than that of the second magnetic layer. By such composition of the thin film magnetic head and the magnetic storage apparatus including the thin film magnetic head, the generation of a stronger magnetic field is made possible and high-density recording on a high-coercivity medium (of coercivity of 4000 Oe, for example) is realized.

By the method for manufacturing a thin film magnetic head in accordance with the present invention, a thin film magnetic head capable of carrying out high-density recording on a high-coercivity medium (of coercivity of 4000 Oe, for example) can be manufactured.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A thin film magnetic head comprising a lower magnetic pole, an upper magnetic pole provided so as to face the lower magnetic pole, and a magnetic gap layer provided between the lower magnetic pole and the upper magnetic pole, wherein:

the upper magnetic pole includes: a first sputtered magnetic layer formed on a side facing the magnetic gap layer; and a second plated magnetic layer formed on the first sputtered magnetic layer, and wherein the saturation magnetic flux density of the first sputtered magnetic layer is set higher than that of the second plated magnetic layer.

2. A thin film magnetic head as claimed in claim 1, wherein:

the first sputtered magnetic layer and the second plated magnetic layer contain CoNiFe or CoFe, and the composition of CoNiFe or CoFe is set as 10≦Co≦80 wt %, 0≦Ni≦25 wt %, and 15≦Fe≦90 wt %.

3. A thin film magnetic head as claimed in claim 2, wherein the density of Fe contained in the first sputtered magnetic layer is set higher than the density of Fe contained in the second plated magnetic layer.

4. A thin film magnetic head comprising a lower magnetic pole, an upper magnetic pole provided so as to face the lower magnetic pole, and a magnetic gap layer provided between the lower magnetic pole and the upper magnetic pole, wherein:

the upper magnetic pole includes: a sputtered magnetic underlayer formed on a side facing the magnetic gap layer; and a plated magnetic layer formed on the sputtered magnetic underlayer, and wherein a saturation magnetic flux density of the sputtered magnetic underlayer is higher than a saturation magnetic flux density of the plated magnetic layer.

5. A thin film magnetic head according to claim 4, wherein a density of Fe contained in the sputtered magnetic underlayer is higher than a density of Fe contained in the plated magnetic layer.

6. A thin film magnetic head according to claim 5, wherein the sputtered magnetic underlayer and the plated magnetic layer contain CoNiFe or CoFe, and the composition of CoNiFe or CoFe is set as 10≦Co≦80 wt %, 0≦Ni≦25 wt %, and 15≦Fe≦90 wt %.

7. A thin film magnetic head comprising a lower magnetic pole, an upper magnetic pole provided so as to face the lower magnetic pole, and a magnetic gap layer provided between the lower magnetic pole and the upper magnetic pole, wherein:

the upper magnetic pole includes: a first sputtered magnetic underlayer, formed on a side facing the magnetic gap layer; and a second plated magnetic layer, formed on the first sputtered magnetic underlayer, and wherein a density of Fe contained in the first sputtered magnetic underlayer is higher than a density of Fe contained in the second plated magnetic layer so that a saturation magnetic flux density of the first sputtered magnetic underlayer is higher than a saturation magnetic flux of the second plated magnetic layer.

8. A thin film magnetic head according to claim 7, wherein the first sputtered magnetic layer and the second magnetic plated layer contain CoNiFe or CoFe, and the composition of CoNiFe or CoFe is set as 10≦Co≦80 wt %, 0≦Ni≦25 wt %, and 15≦Fe≦90wt %.

9. A thin film magnetic head comprising a lower magnetic pole, an upper magnetic pole provided so as to face the lower magnetic pole, and a magnetic gap layer provided between the lower magnetic pole and the upper magnetic pole, wherein the upper magnetic pole includes: a first sputtered magnetic underlayer formed on a side facing the magnetic gap layer; and a second plated magnetic layer, formed on the first sputtered magnetic underlayer, and wherein a saturation magnetic flux density of the first sputtered magnetic plating underlayer is higher than a saturation magnetic flux density of the second plated magnetic layer, and a density of Fe contained in the first sputtered underlayer is higher than a density of Fe contained in the second plated magnetic layer.

10. A thin film magnetic head according to claim 9, wherein the first sputtered magnetic underlayer and the second plated magnetic layer contain CoNiFe or CoFe, and the composition of CoNiFe or CoFe is set as 10≦Co≦80 wt %, 0≦Ni≦25 wt %, and 15≦Fe≦90 wt %.

* * * * *